(12) United States Patent  
Krugh, IV

(10) Patent No.: US 8,698,610 B2  
(45) Date of Patent: Apr. 15, 2014

(54) ELEVATED STOP INDICATOR LIGHTS FOR PASSENGER BUS

(76) Inventor: John Adam Krugh, IV, Prairie Village, KS (US)

( * ) Notice: Subject to any disclaimer, the term of this patent is extended or adjusted under 35 U.S.C. 154(b) by 191 days.

(21) Appl. No.: 13/181,697

(22) Filed: Jul. 13, 2011

(65) Prior Publication Data

US 2012/0013454 A1    Jan. 19, 2012

Related U.S. Application Data

(60) Provisional application No. 61/364,252, filed on Jul. 14, 2010.

(51) Int. Cl.
*B60Q 1/26* (2006.01)

(52) U.S. Cl.
USPC ............ 340/433; 340/468; 340/471; 340/472

(58) Field of Classification Search
USPC .......... 340/433, 468, 471, 472; 362/464, 487, 362/540, 541, 542, 543, 545
See application file for complete search history.

(56) References Cited

U.S. PATENT DOCUMENTS

| | | | |
|---|---|---|---|
| 4,758,931 A | | 7/1988 | Gabaldon |
| 5,400,225 A | | 3/1995 | Currie |
| 5,467,071 A | * | 11/1995 | Koenig ........................ 340/433 |
| 5,497,304 A | * | 3/1996 | Caine ............................ 362/485 |
| 5,839,231 A | | 11/1998 | Gebhart et al. |
| 6,018,295 A | | 1/2000 | Jewell et al. |
| 6,337,623 B1 | | 1/2002 | Krugh, IV et al. |
| 6,515,583 B1 | | 2/2003 | Lamparter et al. |
| 6,619,824 B1 | | 9/2003 | Hou |
| 6,764,210 B2 | | 7/2004 | Akiyama |
| 6,866,406 B1 | * | 3/2005 | Starkey et al. ................ 362/501 |
| 6,919,800 B2 | | 7/2005 | Wu |
| 7,172,322 B2 | | 2/2007 | Pommeret et al. |
| 7,868,555 B2 | * | 1/2011 | Peron et al. ..................... 315/77 |
| 8,075,169 B2 | * | 12/2011 | Englander .................... 362/478 |
| 2003/0151504 A1 | | 8/2003 | Chang |
| 2004/0057241 A1 | | 3/2004 | Lin |
| 2006/0208867 A1 | | 9/2006 | McLoughlin et al. |
| 2009/0129106 A1 | | 5/2009 | Sugiura et al. |
| 2009/0273941 A1 | | 11/2009 | Englander et al. |

OTHER PUBLICATIONS

Office Action dated Aug. 23, 2013 for corresponding Canadian patent application No. 2,746,270.

* cited by examiner

*Primary Examiner* — Toan N Pham
(74) *Attorney, Agent, or Firm* — Erickson, Kernell, Derusseau & Kleypas, LLC

(57) ABSTRACT

An elevated stop indicator light system for vehicles such as school buses comprises a translucent or transparent tubular housing having a strip of light emitting diodes extending therethrough, the housing being secured to a drip rail extending along and above side and/or rear windows of the vehicle by clips fastened to the vehicle. Operation of the elevated light system is coordinated with conventional warning devices, such as a fold-out stop sign and flashing red lights of the bus. The elevation of the stop indicator light system provides a highly visible warning system for surrounding traffic when the view of the conventional warning sign on the side of the bus is obscured by traffic.

16 Claims, 3 Drawing Sheets

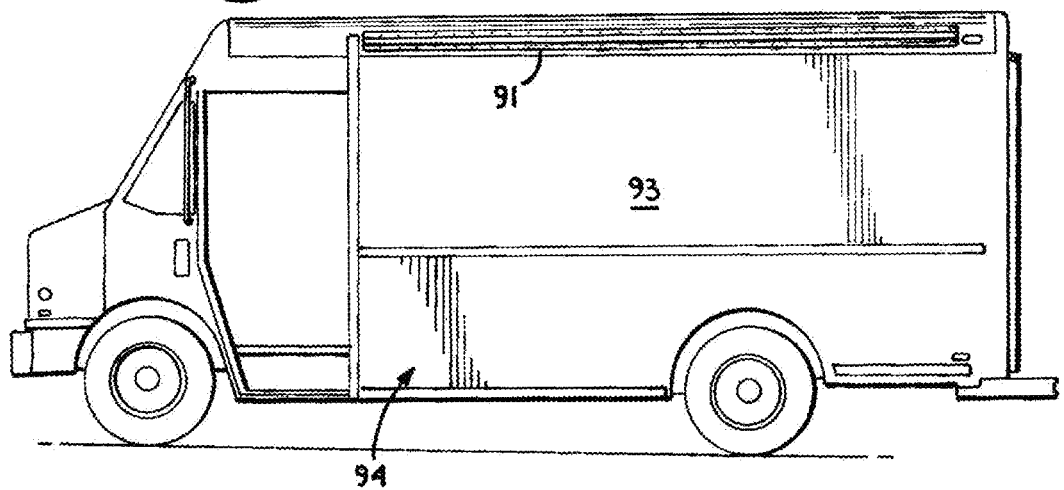
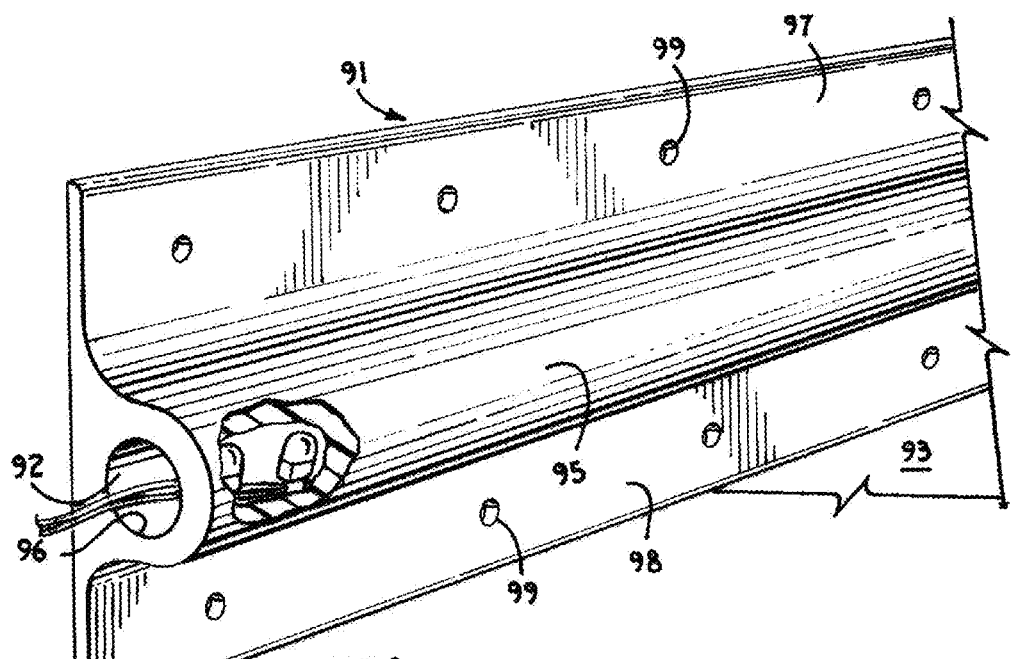

ELEVATED STOP INDICATOR LIGHTS FOR PASSENGER BUS

CROSS-REFERENCE TO RELATED APPLICATIONS

This application claims the benefit of U.S. provisional patent application Ser. No. 61/364,252, filed Jul. 14, 2010, under 35 U.S.C. §119(e).

BACKGROUND OF THE INVENTION

1. Field of the Invention

This invention relates to a warning system for vehicles and, in particular, to a supplemental warning light system for buses.

2. Background & Description of the Related Art

School buses are used extensively throughout the United States for transporting school children to and from school and school-related activities. Although the safety records of school buses have improved, accidents still occur when the school children exit or enter the bus. A substantial problem is that children exiting a school bus and wanting to cross the roadway face the hazard of being struck by other vehicles traveling on the roads. Regulations in most areas of the United States, Canada, and other countries require school buses to activate flashing yellow lights when preparing to stop or make turns and flashing red lights and a swing-out stop sign when the bus has stopped. When these warning systems are activated, motorists traveling in all directions on the road are required to stop and remain stopped until the flashing red lights and stop sign are deactivated. The warning system is commonly a sign assembly near the front driver's side of the bus. The sign assembly is operable to shift the warning sign, or "stop" sign, between a non-extended or retracted position adjacent to the side of the bus and an extended position extending the sign outwardly from the side of the bus.

It has been found that due to the heights of many vehicles, conventional warning signs that extend from the sides of school buses are not always visible to drivers of adjacent vehicles. Rather, due to the heights and locations of the conventional warning signs, view of the signs are often obscured by neighboring vehicles such as vans, sports utility vehicles and the like.

The prior art teaches various warning signals attached to vehicles and, in particular, to buses. For example, U.S. Published Patent Application No. 2009/0273941 by Englander et al. teaches a lighting or light emitting diode (LED) strip mounted on the sides of a school bus. The light strips may be removably mounted in sliding channels mounted to the bus. Englander et al. also teach the light strip may be switched on automatically via a switch which interfaces with a power source, with the opening of the door, such as by the turning on of the light in the stairwell of the door of the bus by operation of the door control. Alternatively, the school bus driver may separately turn on or off the lighting strip. As another alternative, the control may respond to the vehicle's transmission state, e.g., park, drive, etc. However, the lighting strip disclosed by Englander et al. is located even lower than the conventional warning signs. While the lighting strip may assist loading and unloading passengers, cars stopped alongside the bus will likely obscure the lights from other traffic.

Various publications disclose lights installed on various parts of a vehicle as part of a warning system. U.S. Pat. No. 7,172,322 to Pommeret et al. teaches framing for a window of a motor vehicle passenger compartment to form a light unit whose housing is constituted by the framing for the periphery of a window. The structure of the framing constitutes uprights and a longitudinal support plate to support light emitting diodes (LEDs). Similarly, U.S. Pat. No. 5,400,225 to Currie and U.S. Pat. No. 4,758,931 to Gabaldon each disclose an illumination device or lighting assembly mounted around the periphery or border of the rear window of a motor vehicle. However, neither discloses the placement of an LED strip or flexible electroluminescent light source strand mounted around the periphery of the side windows of a vehicle to elevate the warning system above neighboring traffic.

Further, various warning systems have been adapted to supplement the conventional school bus warning systems. For example, these supplemental systems are designed to warn the children of on-coming traffic with a variously colored light system such as U.S. Pat. No. 5,578,983 to Inwood et al. These systems are not designed to notify surrounding traffic of children loading on or unloading from the school bus.

With the purpose of improving over the shortcomings of the prior art, a supplemental warning system is needed that, when activated, is readily visible to all surrounding vehicles.

SUMMARY OF THE INVENTION

The present invention generally comprises a light strip or string of lights secured along the side of a vehicle such as a bus or delivery vehicle to function as warning lights. The lights may be secured to the gutter, drip rail or exterior sun visor extending above and along the upper periphery of the front, side and/or rear windows of a school bus or similar structure found on delivery vehicles. The lights may be positioned within a translucent, tubular housing that is preferably relatively rigid. A flexible light emitting diode (LED) strip is particularly well suited for use as the string of warning lights. The tubular housing containing the light strip may be attached to the base of the gutter, drip rail or visor using a plurality of clips adapted to fit variously shaped structures such as gutters and hold the tubular housing under the base of the structure. Each clip includes a mounting member and a tube support member or hook. The tube support member is circular or c-shaped and sized to tightly receive or fit around the tubular housing. A plurality of clips is secured around the tube in spaced relation along the length of the tubular housing. The mounting members may be secured to the gutter or the like using rivets, screws, or other types of fasteners. Other types of clips or connectors may be used to securely connect the tube containing the light string to the bus below the gutter or the like.

The light strip may be activated either independently by the driver, depending on his observations of traffic conditions; may be coupled with the conventional warning system whereby when the conventional warning system is activated, the light strip of present invention is illuminated; or may be activated by being coupled with the doors of the bus whereby when the doors are opened the light strip is automatically illuminated.

The placement of the light strip creates a high visibility warning light indicating the possible presence of pedestrians loading or unloading the bus to other drivers or the possible presence of delivery personnel entering or exiting the delivery vehicle. Accordingly, the vehicle stop light indicator is visible from a distance because it is located above the tops of adjacent passenger vehicles in traffic and may be readily viewed by drivers in traffic surrounding the bus or delivery vehicle. In rural areas, even where there is no additional traffic, the height of the supplemental warning lights warns drivers from afar that the bus or delivery vehicle is stopped and/or loading or unloading.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 6 is a side view of a package delivery vehicle having an alternative embodiment of a light string housing shown secured to a side panel of the vehicle.

FIG. 7 is an enlarged and fragmentary perspective view of the light string housing as shown in FIG. 6.

DETAILED DESCRIPTION OF THE PREFERRED EMBODIMENTS

Figure 1:
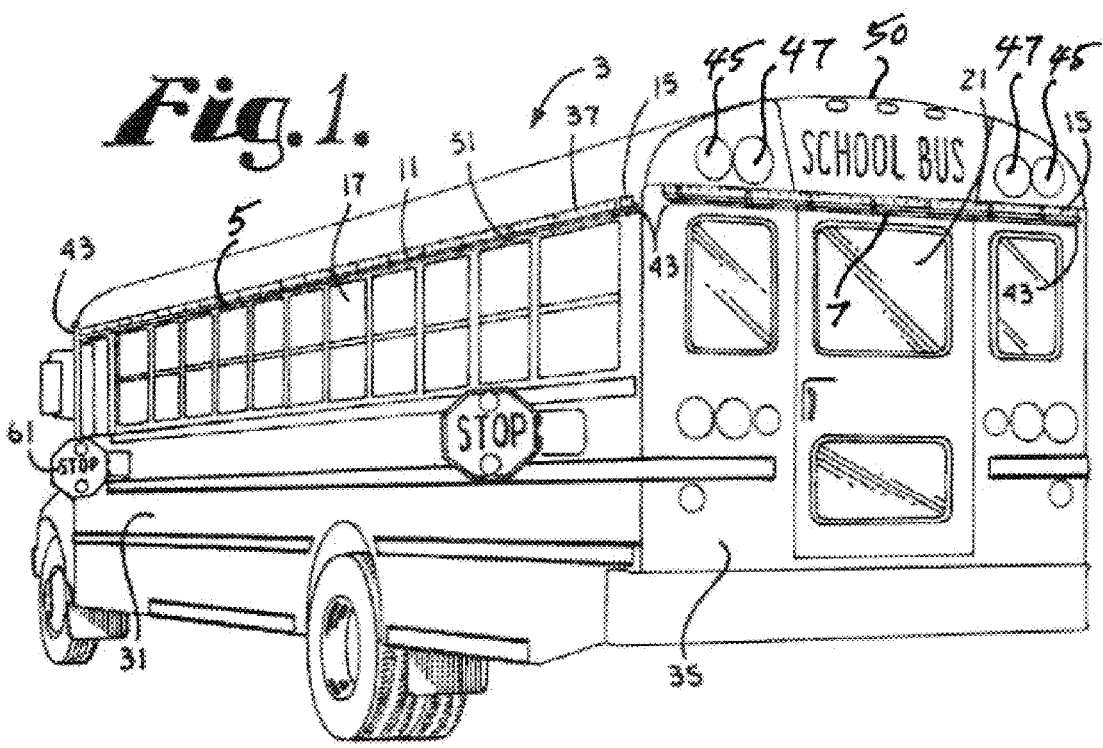
FIG. 1 is a perspective view of a school bus having an embodiment of an elevated stop indicator light system for passengers according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" is used with reference to an element is the language intended to be limited to one of the elements specified, or any other similarly limited number of elements.

Referring to the drawings in more detail, the reference number 1 generally designates an embodiment of an elevated stop indicator light system for vehicles, such as passenger buses, according to the present invention. The stop indicator light system is particularly well adapted for use with school buses. The stop indicator light system 1 generally includes a pair of side light strips 5 and a rear light strip 7 positioned respectively on the right and left sides 31 and a rear side 35 of the vehicle 3 at elevated positions to improve viewing by other drivers. The side light strips 5 may be described as extending longitudinally relative to the bus and the rear light strip 7 extends laterally or transverse to the bus. The light strips 5 and 7 are activated to warn drivers approaching the vehicle 3 and in the vicinity thereof of changes in the operation of the vehicle, such as stopping and discharging an occupant or occupants of the vehicle 3. Although in a preferred embodiment the light strips 5 and 7 extend across both sides and the rear of the bus respectively, it is foreseen, that a single light strip 5 extending across the driver's side of the bus or vehicle may adequately provide the desired warning feature sought. Alternatively a light strip 5 may be secured across the driver's side in combination with a light strip 7 across the rear of the bus without a strip on the side opposite the driver.

Referring to FIG. 1, the vehicle 3 is a type of vehicle which makes frequent stops and may have persons entering or leaving the vehicle. Such a vehicle may include a multiple passenger vehicle such as a passenger bus, a package delivery vehicle, a mail delivery truck, a refuse pick-up truck, or the like. The illustrated vehicle 3 is a school bus. In addition to types of lights typically provided on a vehicle, such as head lights, tail lights, turn signal lights, back-up lights, running lights, and so on, school buses are typically provided with front and back sets of special warning lights, including yellow flashing lights 45 and red flashing lights 47. The yellow lights 45 are activated when the bus 3 is about to make a turn or a stop. The yellow lights 45 are deactivated and the red lights 47 are activated when the bus door (not shown) is opened to allow passengers to board or leave the bus 3. The red lights 47 are usually activated in coordination with other warning devices, such as out-folding "stop" signs 61. In most jurisdictions, drivers approaching from behind or oncoming are required to stop and avoid passing the bus 3 while the red lights 47 flash, at least on undivided roadways and in some areas on divided roadways. When the red lights 47 are deactivated and the stop signs 61 are retracted, drivers may pass the bus 3 with caution.

The yellow lights 45 may be interconnected with a turn signal switch (not shown) or a brake switch 70 (FIG. 5) so that whenever either a turn signal lever (not shown) or a brake pedal (not shown) is operated, the yellow lights 45 are activated. Similarly, the red lights 47 and the stop signs 61 may be interconnected with a door switch 72 which are activated whenever a door handle 74 is operated to open the bus door and deactivated when the door is closed. It is also foreseen that the lights 45 and 47 and the stop signs 61 could be operated manually or have a manual override.

Figure 2:
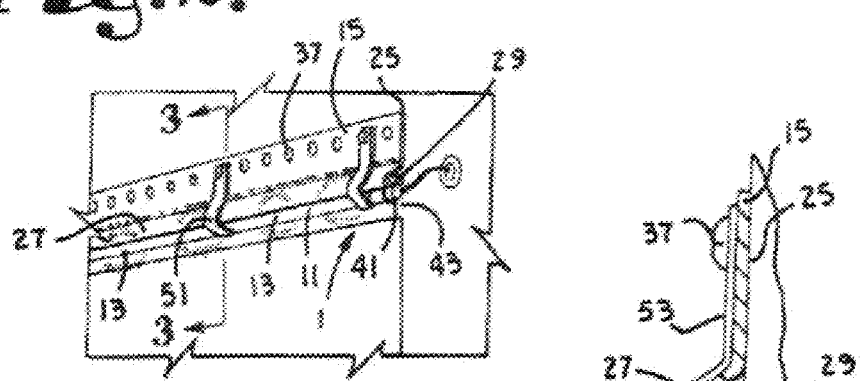
FIG. 2 is an enlarged fragmentary perspective view illustrating details of the light system mounted on the bus.
Figure 3:
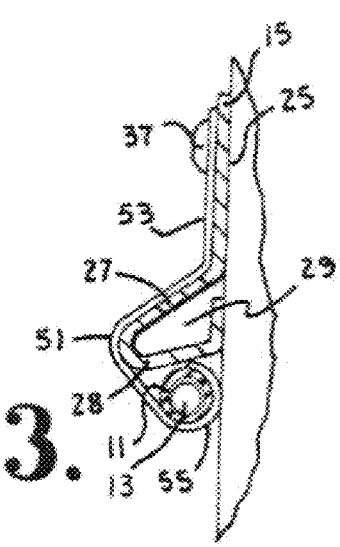
FIG. 3 is a further enlarged cross-sectional side view of the bus stop indicator light system, taken on line 3-3 of FIG. 2 and illustrating mounting details of the light system.
Figure 4:
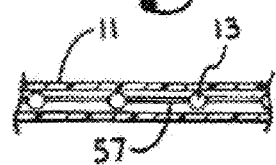
FIG. 4 is an enlarged cross-sectional view of the tubular housing and light strip of the light system.

Referring to FIGS. 2-4, each of the illustrated light strips 5 and 7 is formed by an elongated tubular housing 11 having a plurality or strip of electrical light sources 13 extending therethrough. The light sources 13 could be incandescent lamps; however, preferably the light sources are light emitting diodes or LED's. The LED's 13 are regularly spaced along the housing 11. A preferred spacing of the light sources 13 will range from one to six inches and typically between two to four inches, although narrower or wider spacing could be utilized. The housing 11 is preferably formed of a transparent or translucent material and may also be described as a lens. As used herein, transparent materials may also be described as being translucent.

The illustrated tubular housing 11 has a circular cross-section and is sized or cut to length to extend along a substantial length of the bus 3. The housing 11 may be available in various lengths to accommodate various sized sides and ends of the vehicle 3. The light strips 5 and 7 may be tightly received within the circular cross-section along the length of the housing 11 such that the strip of LED's 13 does not easily shift within the tubular housing 11. End caps 41 may be employed to close ends 43 of the tubular housing 11 to create a water tight seal and to protect the LED's 13 positioned therein. The end caps 41 may be threaded onto the tubular housing ends 43 or, alternatively, may be press fit or otherwise attached to the tubular housing ends 43 by various methods known to those of ordinary skill in the art. Wiring 57 (FIG. 4) could pass out of one or both of the end caps 41 of a light strip 5 or 7.

The light strips 5 and 7 are secured to the vehicle 3 at elevated locations to maximize their visibility, such as at a level which is in elevated spaced relation below the level of a roof or peak 50 of the vehicle 3, that is, below the level of the roof 50, but well elevated above the street level. In an illustrated embodiment, the bus 3 is provided with drip rails or gutters 15 which extend along and above a plurality of horizontally adjacent side windows 17 and rear windows 21 of the bus. The drip rails 15 may be variously shaped depending on the manufacture of the bus 3. Each of the drip rails 15 illustrated in FIGS. 2 and 3 includes a vertical mounting member 25 and a triangular foot 27 formed at a bottom thereof. The triangular foot 27 and a mounting base 28 form a cavity 29 along the length of the drip rails 15. The vertical mounting member 25 is spaced above the windows 17, 21 and affixed to each side 31 and rear 35 of the bus 3. The vertical mounting member 25 may be affixed to the wall of the vehicle 3 by fasteners 37, such as rivets, screws, bolts, or other means of attachment as known to those of ordinary skill in the art.

The tubular housing 11 of each of the light strips 5 and 7 containing the strip of LED's 13 is placed along the mounting base 28 of the triangular foot 27 of the gutter or drip rail 15 and is attached thereto by a plurality of mounting clips 51. Each of the illustrated clips 51 is formed by a vertical mounting member 53 and a circular or C-shaped tube receiver or attaching member 55. The tubular housing 11 is snugly received within the attaching member 55 of a plurality of clips 51. The clips 51 may be evenly spaced along the length of the tubular housing 11. The clip mounting members 53 may be attached to the bus 3 one of the fasteners 37, or by special fasteners (not shown). It may be possible to use existing rivet locations to allow attachment of the tubular housing 11 without modification of the existing structure of the drip rail 15 or bus 3. The clips 51 may be adapted to fit variously shaped gutters 15. Additionally, the tube receivers 55 may be connected to the mounting members 53 by a hinge (not shown) to allow for convenient installation or removal of the tubular housing 11, should replacement be necessary. Alternatively, the clips may be sufficiently flexible to allow the tube receivers 55 to flex relative to the mounting members 53 along a hinge point to allow the tubular housing 11 to be installed and removed from the tube receivers 55 of the clips 51.

Figure 5:
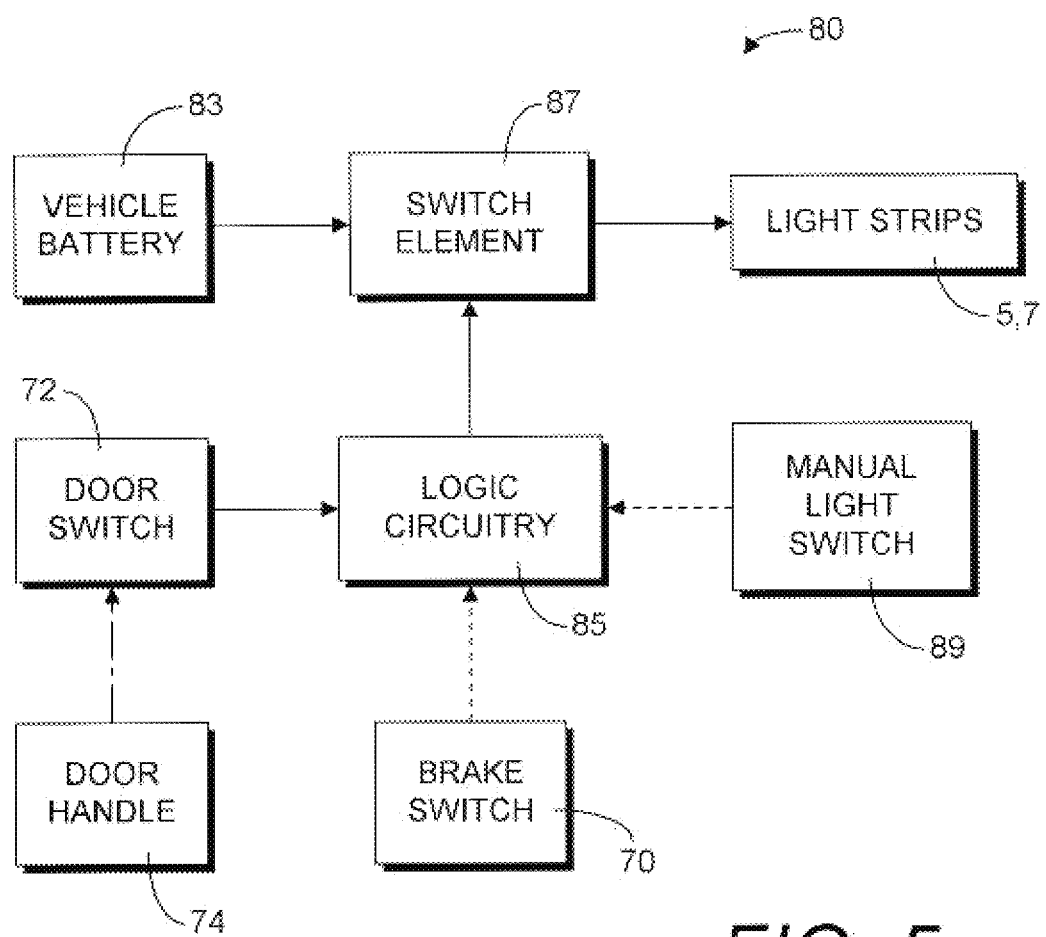
FIG. 5 is a block diagram illustrating control circuitry for the elevated stop indicator light system.

FIG. 5 illustrates an exemplary diagram of control circuitry 80 for the light strips 5 and 7. The vehicle 3 includes a vehicle battery 83 which is selectively coupled to the light strips 5 and 7 to activate the LED's thereof to illuminate. The control circuitry 80 may include logic circuitry or a processor 85 which receives inputs from other switches, such as the brake switch 70 or the door switch 72, and controls a switch element 87 accordingly. The logic circuitry 85 may be implemented as a coordinated set of relays, transistors, logic gates, a microprocessor, or the like. Similarly, the switch element 87 may be a relay, a transistor, or the like. In a simplest embodiment of the control circuitry 80, the logic circuitry 85 and switch element 87 could be eliminated, and the light strips 5 and 7 could be controlled by the door switch 72. The logic circuitry 85 may be provided on the vehicle 3 for coordinating the operation of other devices, such as the flashing lights 45 and 47 or the stop sign 61, and may also be used to control activation of the elevated light strips 5 and 7. The control circuitry 80 may include a manual switch 89 for manual activation of the elevated light strips 5 and 7. Although the elevated light strips 5 and 7 could be activated in coordination with the brake switch 70 or by the manual switch 89, it appears to be most preferable for the light strips 5 and 7 to be activated and deactivated in coordination with operation of the door switch 72 when the door is opened and closed.

In an embodiment of the elevated stop indicator light system 1, the tubular housing 11 is neutrally colored and translucent, and the LED's 13 emit red light. It is foreseen that the housing 11 could be translucent red, while the LED's emit either red or white light. Preferably, the LED's 13 employed are of a high efficiency type to maximize light output per unit of electrical power. In order to increase their visual impact, the LED's 13 preferably flash when activated, either synchronized with the red lights 47, alternating with the red lights 47, or in an independent pattern. It is foreseen that in an alternative embodiment of the light system 1, red LED's 13 could alternate with yellow LED's 13, and the yellow LED's could be activated with the yellow flashing lights 45, while the red LED's could be activated with the red flashing lights 47. When LED's 13 of alternating color are used, the preferred spacing of adjacent lights may be approximately one or two inches such that similar colored lights are spaced apart two or four inches respectively. The tubular housing 11 protects the light strips 5 and 7 and integrated wiring 57 from impact with passing branches or other debris and objects. Depending on the level of translucence or opacity of the tubular housing 11, a viewer may see the illuminated lights individually or as an illuminated tube, respectively.

As described, the configuration and placement of the stop light indicator light system 1 presents the protected light strips 5 and 7 or illuminated tubular housing 11 horizontally along an elevated portion of the bus 3 or vehicle. The elevated light system 1 will preferably be spaced well above the conventional warning stop signs 61. Supporting the tubular housing 11 of each light strip 5 and 7 from the drip rails 15 positions the light strips 5 and 7 in a desired elevated position. This location creates high visibility warning lighting indicating the presence of a loading or unloading school bus 3 or delivery vehicle to other drivers. Accordingly, the elevated light system 1 should visible from a distance because it is high above the tops of adjacent passenger vehicles in traffic and may be readily viewed by drivers in traffic surrounding the school bus. In rural areas, even where there is no additional traffic, the height of the supplemental warning lights warns drivers from afar that the bus is stopped and/or loading or unloading.

FIGS. 6 and 7 show an alternative embodiment of a housing 91 for securing a string of lights 92 to a side or rear panel 93 of a delivery type vehicle 94. The housing 91 may be extruded from translucent or transparent plastic and include a central body or tube 95 with a bore 96 extending therethrough in which the string of lights 92 is positioned and a pair of outwardly projecting flanges or feet 97 and 98 for mounting to a panel of the vehicle. Fastener receivers 99 are formed in spaced relation through the flanges 97 and 98. Fasteners may be driven through the flanges 97 and 98 for securing the housing 91 to a vehicle panel 93. The string of lights 92 is preferably supported in closely spaced relation below the roof of the delivery vehicle 94 and also preferably extends above an upper end of the vehicle windshield or cab.

It is to be understood that while certain forms of the present invention have been illustrated and described herein, it is not to be limited to the specific forms or arrangement of parts described and shown. For example, it is to be understood that the light sources could be molded into a housing or otherwise formed therein.

What is claimed as new and desired to be secured by Letters Patent is as follows:

1. An elevated stop indicator light system for and in combination with a bus having a plurality of longitudinally adjacent windows extending along each side of said bus, a drip rail on each side of said bus extending above said plurality of longitudinally adjacent windows and an electrical power source, said system comprising:
   (a) an elongated strip of electrical light sources secured to and suspended below each of the drip rails and extending longitudinally across a portion of each side of said bus to extend along and above said longitudinally adjacent windows; and
   (b) circuitry operable to selectively couple said light sources to an electrical power source to activate said light sources.

2. The system as set forth in claim 1 wherein said bus further includes a rear drip rail positioned in elevated spaced relation above longitudinally adjacent windows along a rear of said bus and said system further comprises an elongated rear strip of electrical light sources supported below said rear drip rail.

3. The system as set forth in claim 1 wherein each of said elongated strips of light sources includes
   a plurality of interconnected light sources extended in regularly spaced relation through an elongated tubular housing formed of a material capable of passing light therethrough.

4. The system as set forth in claim 1 wherein
said light sources are light emitting diodes.

5. The system as set forth in claim 1 wherein:
   (a) said bus has a door switch activated by opening a bus door; and
   (b) said circuitry is coupled to said door switch in such a manner that said light sources are activated when said door switch is activated.

6. The system as set forth in claim 1 wherein each said drip rail is attached to said bus by a plurality of fasteners and each of said elongated strips of electrical light sources are supported from said drip rails by at least one mounting clip, said mounting clip supported from at least one of said fasteners.

7. An elevated stop indicator light system for a bus having a plurality of horizontally adjacent windows located respectively on a pair of opposite sides and a rear end of said bus and a drip rail extending along and above said plurality of horizontally adjacent windows on opposite sides, said bus having a vehicle electrical power source, and said system comprising in combination with said bus:
   (a) an elongated strip of electrical light sources positioned to extend along and above said windows on at least a driver's side of said bus;
   (b) said elongated strip of electrical light sources secured to and supported below said drip rail extending along said plurality of horizontally adjacent windows on at least the driver's side of said bus, wherein placement of said elongated strip of electrical light sources below the drip rail protects said elongated strip of electrical light sources from damage; and
   (c) circuitry operable to selectively couple said light sources to a vehicle electrical power source to activate said light sources.

8. A system as set forth in claim 7 wherein each of said elongated strips of light sources includes
   a plurality of interconnected light sources extended in regularly spaced relation through an elongated tubular housing formed of a material capable of passing light therethrough.

9. A system as set forth in claim 7 wherein
said light sources are light emitting diodes.

10. A system as set forth in claim 7 wherein:
    (a) said bus has a door switch activated by opening a bus door; and
    (b) said circuitry is coupled to said door switch in such a manner that said light sources are activated when said door switch is activated.

11. A system as set forth in claim 7 wherein said elongated strip of electrical light sources is supported from said drip rail by at least one mounting clip.

12. A method of enhancing a warning light system for a bus having passenger windows and at least one drip rail extending above and along the passenger windows, said method comprising the steps of:
    a) connecting a string of electrically interconnected light sources to and below the drip rail and across at least a portion of a side of said bus above said passenger windows such that placement of said string of electrically interconnected light sources below said drip rail protects said string of electrically interconnected light sources from damage;
    b) electrically connecting said string of electrically interconnected light sources to a switch connected to an electrical power source of said bus, said switch operable to selectively energize said string lights.

13. The method as in claim 12 wherein said step of supporting said string of lights from said drip rail comprises stringing said string of lights through a translucent tube and then supporting said tube from said drip rail.

14. The method as in claim 12 wherein said step of electrically connecting said string of lights to a switch comprises connecting said string of lights to a switch such that said string of lights is energized when a door of the bus is opened.

15. The method as in claim 12 wherein said step of supporting a string of lights comprises stringing said string of lights through a translucent tube and supporting said tube across at least a portion of a driver's side of said bus.

16. An elevated stop indicator light system for a bus having a plurality of horizontally adjacent windows located respectively on a pair of opposite sides of said bus and a drip rail extending along and above said plurality of horizontally adjacent windows on each of said opposite sides of said bus, said bus having a vehicle electrical power source, and said system comprising in combination with said bus:
    (a) an elongated strip of electrical light sources strung through a translucent, tubular housing connected to and supported below said drip rail and above said plurality of adjacent windows on at least a driver's side of said bus such that said elongated strip of electrical light sources is protected from damage; and
    (b) circuitry operable to selectively couple said light sources to the vehicle electrical power source to activate said light sources.

* * * * *